(12) United States Patent
Rao (10) Patent No.: US 9,177,316 B2
(45) Date of Patent: Nov. 3, 2015

(54) MOBILE MONETARY TRANSACTIONS AND BANKING FOR RURAL POPULATIONS

(76) Inventor: Bindu Rama Rao, Laguna Niguel, CA (US)

( * ) Notice: Subject to any disclaimer, the term of this patent is extended or adjusted under 35 U.S.C. 154(b) by 662 days.

(21) Appl. No.: 12/799,600

(22) Filed: Apr. 27, 2010

(65) Prior Publication Data

US 2011/0208657 A1 Aug. 25, 2011

(30) Foreign Application Priority Data

Feb. 19, 2010 (IN) .......................... 427/CHE/2010 A (51) Int. Cl.

| | |
|---|---|
| *G06Q 20/00* | (2012.01) |
| *G06Q 20/38* | (2012.01) |
| *G06Q 20/10* | (2012.01) |
| *G06Q 20/22* | (2012.01) |
| *G06Q 20/32* | (2012.01) |
| *G06Q 20/36* | (2012.01) |
| *G07F 7/10* | (2006.01) |
| *H04L 9/32* | (2006.01) |
| *H04L 29/06* | (2006.01) |
| *H04W 12/06* | (2009.01) |

(52) U.S. Cl.
CPC ............ *G06Q 20/388* (2013.01); *G06Q 20/105* (2013.01); *G06Q 20/223* (2013.01); *G06Q 20/32* (2013.01); *G06Q 20/363* (2013.01); *G06Q 20/3674* (2013.01); *G07F 7/1025* (2013.01); *H04L 9/3263* (2013.01); *H04L 63/0869* (2013.01); *H04L 2209/56* (2013.01); *H04W 12/06* (2013.01)

(58) Field of Classification Search
CPC ....................................................... G06Q 20/30
USPC ............................................................ 705/72
See application file for complete search history.

(56) References Cited

U.S. PATENT DOCUMENTS

| | | | | |
|---|---|---|---|---|
| 6,142,369 | A * | 11/2000 | Jonstromer | 235/380 |
| 2002/0055835 | A1 * | 5/2002 | Carcoba Olivares et al. | 704/9 |
| 2008/0017704 | A1 * | 1/2008 | VanDeburg et al. | 235/380 |
| 2008/0319875 | A1 * | 12/2008 | Levchin et al. | 705/26 |
| 2009/0143104 | A1 * | 6/2009 | Loh et al. | 455/558 |
| 2012/0233681 | A1 * | 9/2012 | Adams et al. | 726/7 |

\* cited by examiner

*Primary Examiner* — Charles C Agwumezie (57) ABSTRACT

Authenticating users for mobile transactions conducted over mobile phones. In general, the present invention makes it possible to securely authenticate a rural user (using the unique user ID from the uWallet, the client certificate in the mobile phone of the rural user and PIN code/password provided by the rural user) and then permit mobile banking transactions over the mobile phone. Both participating individuals employ their individual mobile phones and secure USB/Bluetooth based mobile banking devices (the uWallet) to authenticate themselves and conduct monetary transactions (funds transfer, mobile payments, etc.).

23 Claims, 4 Drawing Sheets

MOBILE MONETARY TRANSACTIONS AND BANKING FOR RURAL POPULATIONS

CROSS REFERENCES TO RELATED APPLICATIONS

The present patent application claims priority to, and makes reference to Indian patent application, Application No. 427/CHE/2010 A, Date of filing of Application: (Feb. 19, 2010), Publication Date: (Mar. 19, 2010), Title of the invention: MOBILE BANKING FOR RURAL POPULATIONS THROUGH DGS (DHANASAMBANDHI GATIVIDHI SEVA), International classification: G06Q 20/00. The complete subject matter of the above-referenced Indian Patent Application is hereby incorporated herein by reference, in its entirety.

BACKGROUND

1. Technical Field

The present invention relates generally to a conducting monetary transactions using a mobile device and particularly to a solution wherein a user can conduct secure transactions after using a USB-based memory stick for authentication, authorization and security.

2. Related Art

Mobile devices are becoming ubiquitous. People in urban areas carry them and so do people living in rural communities. Most people working in remote locations use mobile phones to stay in touch with their family, customers and take phone calls throughout the day.

Urban-oriented banks and financial institutions in the developing world, such as India, perceive business prospects in shifting focus to the rural sector. The rural Indian market, for example, a hitherto much neglected one, is now emerging as a large pool of high net worth individuals, traders, entrepreneurs, processing industries, marketing and warehousing agencies, market intermediaries, professionals, educational institutions, plantations and so on provides a wide range of business avenues and market for these institutions to diversify the risks and also seek growth.

Despite decades of effort and experimentation in banking; the organised financial sector is still not able to meet the credit gap in the rural sector. It took time for banks to realise the potential of the rural markets. Lack of infrastructure in the rural areas and the focus in the urban sector were the reasons. Directed and subsidised lending, cumbersome procedures, delay in sanctioning loans and lack of statutory backing for recoveries were major impediments to the growth of banking in the rural sector. In view of this, there is great need for technology to provide support to the rural populace via an easy mode of access to bank accounts and credits besides, a need to offer the banking sector an easy reach with minimal infrastructure. The situation is similar in other communities in the world, where commercial banking has made little inroads.

One of the main problems in rural places (villages, small towns, etc.) in the world is the lack of bank branches, ATM machines or other type of financial organizations in proximity to the rural communities. In addition, credit cards are of limited use as there are no departmental stores that accept credit cards or debit cards. Small rural stores do not have point-of-sale devices that are typically used for swiping credit cards and other type of cards to conduct purchases, etc.

Accordingly, the present invention addresses the need for rural people to conduct banking operations, access banking services, make payments to each other, send funds to each other, etc. despite the lack of traditional banking facilities such as ATM machines, banking counters and point-of-sale devices. The present invention enables easy & secure/payment, from even remote rural areas where a mobile telephone network is in place, and without the need for any additional infrastructure costs to the users and the banks. In most rural places in the world, very few ATMs or bank facilities are in proximity to rural people. Very few rural people have bank accounts. In addition, very few point-of-sale (POS) devices are available or used in small stores and places of business. There is a need for simple-to-operate secure financial transaction means. There is also a need to support farmer-to-farmer transactions in rural places where there are no ATM machines available and no banking counters, etc. There is also a need to maintain records of transactions made by rural people as they buy and sell produce.

The present invention also addresses the need to identify an individual properly during mobile transactions, in general. Mobile phones can be stolen and misused, user passwords can be stolen, PIN codes can be hacked (or guessed), etc. Thus, the identity of a user of a mobile phone needs to be properly ascertained and verified. The present invention addresses the "user identity" issue thereby making mobile transactions safer and more secure.

There are a few examples of technology where the mobile telephone network has been used for some types of mobile transactions. The Obopay system requires setting up accounts at Nokia stores and similar outlets initially by a user, and it involves associating a credit card with the user account for subsequent transactions. This makes it harder for rural people, especially those without a credit card, to participate. Once a credit card is associated, subsequent charges made for mobile purchases are conducted via the credit card. The Obopay system can be a burden on the rural user in India, as a network of Nokia stores or similar outlets may not be easily available. The Beam Card requires purchase of Beam Gift cards that are used as pre-paid cards for purchases by users. Beam does not provide mobile banking support, nor adhoc payment from one user to another when the users have not yet setup some kind of account or registered with them—rather it provides gift card purchases and payment against such gift cards. The Done card system used by OSS is also based on gift cards being purchased, often limited to small amounts (cannot be larger than a threshold such as Rs 10000) which limits what a person can do (cannot purchase two large bags of cement or two bags of fertilizers, or even a plane ticket to Delhi from Chennai). The whole gift-card based approach is rather limiting, in that the person has to track down a place where such giftcards are sold, which are often not in the proximity/vicinity of a user. Thus these are unsuitable for rural places.

In general, USB based memory devices are used by people to store their data or transfer data from PCs. The SanDisk miniSD card is slightly smaller than a full size SD card. Originally designed for the mobile phones, this card is used broadly in portable devices. Users plug this miniSD card into mobile phones, often after unplugging their batteries to gain access to a slot or adapter, and such users use the miniSD card to store songs, download videos, etc. Similar microSD cards are also available in the market. Very few if any memory stick manufacturers sell USB based memory sticks that can be tethered to a few mobile phones to store songs that are downloaded by a user. Mini USB ports on mobile devices are primarily used by users to connect to PCs and manage their contact lists, etc.

RFIDs are available to tag retail and wholesale products for sale. In general, a merchant or salesperson with a specialized RFID reader scans such a product (with an RFID tag) and conducts a stocking operation or some such related warehousing and tracking operation. RFID tags are expected to revolutionize tracking of goods and retail sales of goods.

Rural people do not carry credit cards/debit cards and point-of-sale devices are usually unavailable in stores found in rural areas, therefore credit card/debit cards (even if one possesses them) are rendered useless. Access to ready cash is also limited as rural areas (in India or in other rural communities all over the world) do not have reliable ATM machines. The other issue is that authentication of the user in an Indian rural setting via the traditional methods is a problem. Besides, there is a real problem of rural people being excluded from financial systems and the modern innovations in the banking sector, due to their lack of knowledge and limited access to financial education. The present invention addresses all of these problems faced by rural people (in India and other places) by providing a very simple, easy and very secure solution that would have a phenomenal reach with negligible costs to the user.

In view of the foregoing considerations, it is clear that there is a need for an improved system and method for financial transactions between people in rural communities, where there are very few (or none) ATM machines, banks, or modern point-of-sale devices.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

The present invention relates generally to banking in rural sectors/communities, such as in rural India or China, and particularly to a solution wherein a person in a rural area is able to receive funds and send funds to others. The present invention enables people living in rural communities to use their cell phones to provide an innovative funds transfer and payment service without the need to provide credit/debit cards at purchase points. Currently, a rural person has little or no access to an ATM facility and faces a problem when he/she does not have hard cash at hand. The other issue is that vendors do not usually possess point of sale devices needed to record credit card or debit card transactions. In one embodiment, the invention offers a simple, effective and secure solution that will help convert the individual's cell phone effectively into a debit/credit card using or receiving device as the case may be. This would mean that vendors in rural areas would also be benefited with assured secure money transfer, the rural buyer would benefit from access to their bank accounts or to credit. The invention also offers secure pathways making it a safe route for operation. This is a much needed intervention in the rural areas worldwide where banks operate in a very limited way and the capital out-lay for building banking infrastructure is too high to address the immediate need.

Accordingly the invention provides a USB stick (herein called the U-Wallet), that acts in some ways like a credit/debit card when fitted into a mobile telephone, without the need for card swiping devices and card readers, etc. The said arrangement constitutes an easy and simple money transaction network that is made secure through a double authentication system consisting of a client and server mutual authentication at the transport layer (client and server certificates) and end-to-end data encryption. This security is enhanced by the use of a PIN code/password provided by the user. Provisions exist for additional security through additional password protections. Thus the user is uniquely identified, his credentials are verified and secure mobile transactions are supported, all without the use of credit cards, debit cards, card swiping machines, card readers, ATM machines, or point-of-sale devices.

The said invention provides a secure network that provides adequate authentication—sometimes referred to as Surakshith Pramanikaran Network (SPN for short). The monetary transactions—sometimes referred to as Dhanasambandhi Gatividhi Seva (DGS for short) service is provided on the SPN (the secure network). Authentication of the rural users occurs during such monetary transactions employing client certificates provided to such users. The users are also provided with password for security and additional verification. Client certificates are typically installed on mobile devices by users after registration, to enable secure communications as well as subsequent authentication of device/user. Non-repudiation is possible by means of additional password protection for transactions. These client certificates may be provided by a bank regulatory system (such as NABARD or even the RBI in India), or a common banking authority, to ensure transactions across banking institutions.

Figure 1:
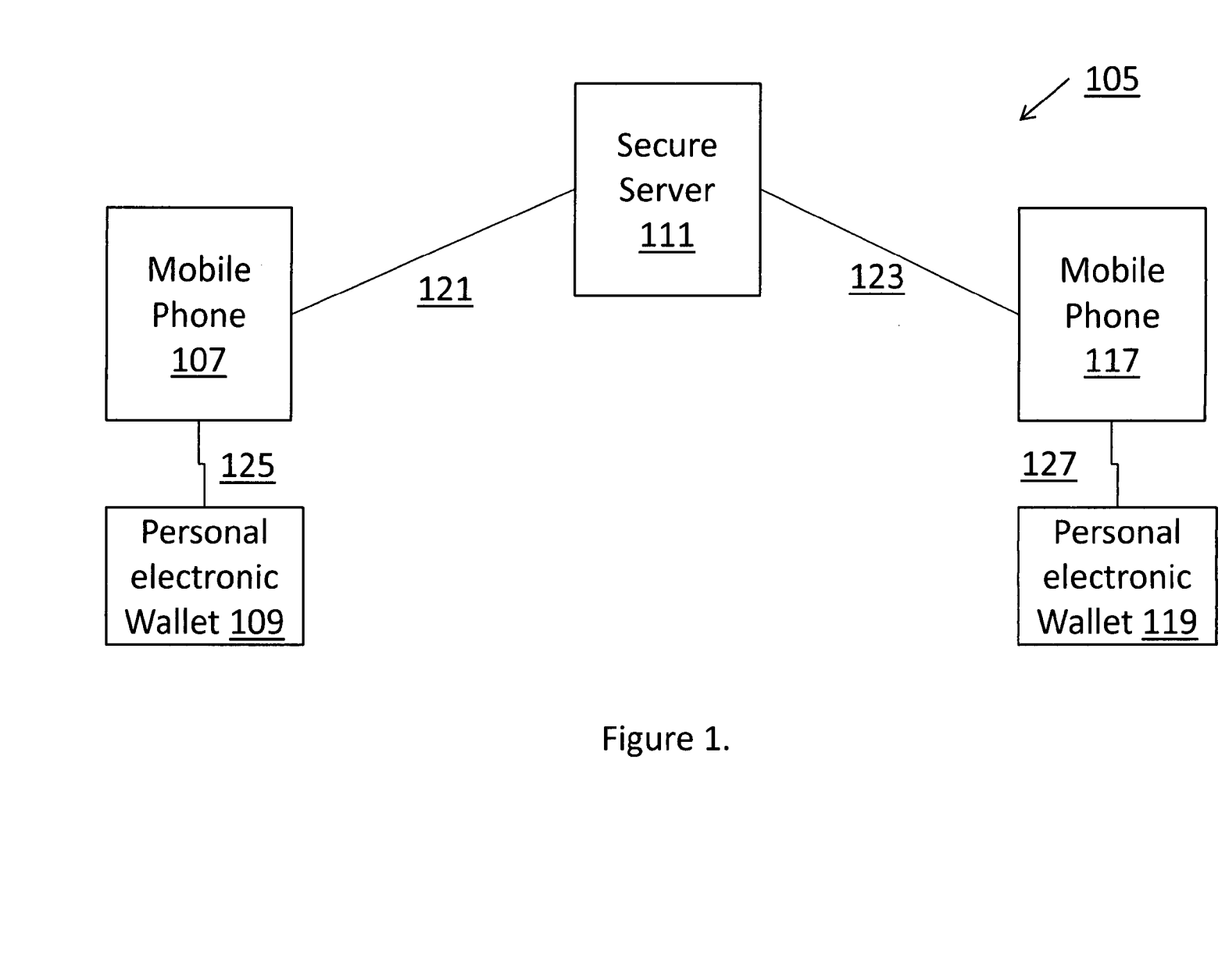
FIG. 1 is a perspective block diagram of a system 105 for conducting financial transactions using mobile phones, wherein secure funds transfer and financial transactions can be conducted by, and between rural people, using their mobile phones, without the use of PCs, modern POS-devices, ATM-machines or credit/debit cards.

FIG. 1 is a perspective block diagram of a system 105 for conducting financial transactions using mobile phones, wherein secure funds transfer and financial transactions can be conducted by, and between rural people, using their mobile phones 107, 117, without the use of PCs, modern POS-devices, ATM-machines or credit/debit cards. The participants on such secure funds transfer transactions employ their personal electronic wallets (also referred to as uWallets) 109, 119 to enable authentication of the participants. The secure server 111 makes it possible for users to authenticate themselves (employing one or more security means) and conduct funds transfer, payments, balance inquiry and other financial transactions.

All communications between the mobile phone 107 and the secure server 111 is over a secure communications layer (such as TLS or SSL), with mutual authentication, wherein the secure server 111 and the mobile device 107 each authenticate the other before conducting data transfer. Similarly, all communications between the mobile phone 117 and the secure server 111 is over a secure communications layer such as TLS or SSL, with mutual authentication. In addition, in one embodiment, the secure server 111 exchanges the public key of the first user on the mobile phone 107 to the mobile phone 117, and the public key of the second user of the mobile phone 117 to the mobile phone 107, thereby making it possible for both mobile phones 107, 117 to encrypt data communicated to the other phone employing the public key received from the other phone. This provides end-to-end encryption facilities. Alternatively, the public keys received by a mobile phone 107 can be used to verify digital signatures of data communicated by the other mobile phone 117 (where the sending device digitally signs the data or message using a private key associated with the sender).

When the user of the mobile phone 107 initiates a secure funds transfer using the mobile phone 107, the user is prompted to plug in his/her personal electronic wallet 109 (into a micro-USB port of the mobile phone 107, for example) and to then enter a PIN code (such as a 4 digit number or password). The user's PIN code is locally compared to a reference PIN code in one embodiment, and securely communicated to the secure server 111 for verification/authorization in a related embodiment. Then, the secure server 111 sends a message to the second party, such as to the user of the mobile phone 117, indicating the start of a funds transfer or financial transaction. In response, the mobile phone 117 prompts the user to plugin his/her personal electronic wallet 119 into the mobile phone 117, and then enter a PIN code/password in order to participate in the attempted funds transfer or financial transaction. Upon local (in the mobile phone 117) or remote (in the secure server 111) verification of the second party's PIN code/password, the details of the attempted funds transfer/transaction is displayed to the second party and the transaction is completed employing procedures and data transfer as necessary.

The personal electronic wallets 109, 119 are also referred to as uWallets, and they are USB based devices in one embodiment, an NFC based device in another embodiment, and Bluetooth based devices in a third embodiment. Specifically, in one embodiment, they are USB based memory sticks that provide a unique identification to the corresponding mobile phones 107, 117, when they are communicatively coupled to them. The uWallets in essence behave as a customer controlled enabler of financial transactions, similar to some of the behavior of typical credit cards and debit cards—without the uWallets being plugged into the mobile phone, a user cannot conduct financial transactions, transfer money, etc.

The secure server 111 tracks the usage of the mobile phone 107 in funds transfer and other transactions and it associates a client certificate assigned to the user of the mobile phone 107 with the PIN code/password of the user, the unique identification retrieved or derived from the personal electronic wallet 109, and one or more accounts (bank account, credit card account, savings account, gift card account, etc.) that are associated with the user. In a related embodiment, an account is automatically created for the user at a financial organization at the time of first usage of the personal electronic wallet 109, or at the time of a registration activity.

The system 105 for conducting financial transactions supports access from laptops, computers and also mobile phones 107, 117. In general, it comprises the secure server 111 that interacts with a first secure mobile device 107 over a secure mutually authenticated network 121. It also comprises the first personal electronic wallet 109 that is capable of interacting securely with the first secure mobile device 107. The first secure mobile device solicits a user personal identification code (also termed PIN code) from a user when the first personal electronic wallet 109 is communicatively coupled to the first secure mobile device 107. The first secure mobile device 107 securely interacts with the first personal electronic wallet 109 and conducts a funds related transaction when the first personal electronic wallet 109 is communicatively coupled to the first secure mobile device 107, and the user is authenticated at least by means of the PIN code.

The first secure mobile device 107 securely reports the funds related transaction to the secure server 111 over the secure mutually authenticated network 121. The second secure mobile device 117 interacts with the secure server 111 over the secure mutually authenticated network 123. The second personal electronic wallet 119 is capable of interacting securely with the second secure mobile device 117. The secure server 111 facilitates funds related transaction between the first secure mobile device 107 and the second secure mobile device 117 when the first personal electronic wallet 109 is communicatively coupled to the first secure mobile device 107 and the second personal electronic wallet 119 is communicatively coupled to the second secure mobile device 117.

In one embodiment, the first personal electronic wallet 109 and the second personal electronic wallet 119 are both USB based memory sticks with a unique identification, that is pluggable and can be communicatively coupled to the first secure mobile device 107 and the second secure mobile device 117, respectively.

The first secure mobile device 107 comprises a first client security certificate that can be used for authentication by the secure server 111. The second secure mobile device 117 comprises a second client security certificate that can be used for authentication by the secure server 111. The secure server 111 communicates a second public key associated with the second client security certificate to the first secure mobile device 107 and a first public key associated with the first client security certificate to the second secure mobile device 117. The first secure mobile device 107 employing the second public key to encrypt the data communicated to the second secure mobile device 117. The second secure mobile device 117 is able to decrypt the encrypted data communicated by the first mobile device 107 employing a corresponding second private key (that corresponds to the second public key). The second secure mobile device 117 also employs the first public key to encrypt the data communicated to the first secure mobile device 107.

In one embodiment, the first client security certificate and the second client security certificate employ public key cryptography that makes use of an asymmetric scheme that uses a pair of keys for encryption: a public key, which encrypts data, and a corresponding private, or secret key for decryption.

In general, the system 105 supports authenticating mutually for secure communications between a first mobile device 107 and the secure server 111 and between a second mobile device 117 and the secure server 111. The system 105 makes it possible to control access to financial transactions on the first mobile device 107 by using a first PIN code, and on the second mobile device 117 by use of a second PIN code. It also supports communicating a first unique identification by the first personal electronic wallet 109 that can be communicatively coupled to the first mobile device 107. In addition, it supports communicating a second unique identification by the second personal electronic wallet 119 that can be communicatively coupled to the second mobile device 117.

It is now possible to identify, by the secure server 111, the first user using the first mobile device 107 based on the first PIN code and the first unique identification. It is also possible to identify a second user currently using the second mobile device 117 based on the second PIN code and the second unique identification.

The system 105 facilitates (by means of the secure server 111), financial transactions between the first user and the second user, wherein such financial transactions are conducted after identifying the first user and the second user. Mutual authentication in the system 105 occurs in a secure communications setup operation over a protocol, wherein the protocol is one of a TLS or SSL protocols. In addition, in one related embodiment, the first personal electronic wallet 109 and the second personal electronic wallet 119 are each one of a USB based memory stick with unique identification support or a bluetooth based memory stick with unique identification support (or, in another embodiment, even an RFID based client unit with unique identification support).

The system 105 is capable of facilitating transactions by prompting the first user on the first mobile device 107 to pick one of a set of supported financial transactions, and receiving, from the first user, details of transactions. Such details comprise identification of one of a set of supported financial transactions, target user or mobile device identification (associating a second user associated with the second mobile device), transaction amounts, etc. It is important to facilitate determination of the second mobile device as the target device for each user selected financial transaction, and the system 105 does support that. It is able to prompt the second user on the second mobile device 117 to communicatively couple the second personal electronic wallet 119 to the second mobile device 117 and to enter a PIN code for authentication/authorization, in order to continue with the transactions. It is capable of transferring details regarding the one of a set of supported financial transactions (selected by the first user) to the second mobile device 117 for display (and for collecting second user approval, for example) to the second user. It is also capable of sending a user response regarding the one of a set of supported financial transactions from the second mobile device 117 to the first mobile device 107.

The present invention also employs the retrieval of an IMEI of the first mobile device 107 and/or MSISDN currently associated with the mobile device 107, and associating them with the user's payment operations or money transactions conducted on the mobile device 107. It also addresses verifying the authorization of the associated user to conduct specific types of payment operations or transactions, based on the IMEI, MSISDN or related user data.

In one embodiment, the system 105 supports RFID based identification of users (such as farmers or rural people) such as the first user using the first mobile device 107. For example, the first user is provided with an RFID tag to uniquely identify the first user, and the first mobile device 107 is capable of reading the RFID tag provided to the first user (when in proximity). Then, the first user employs the RFID tag to conduct mobile banking, payments, and other transactions from the first mobile device 117. Thus, in this embodiment, some of the users use RFID based uWallets that comprise RFID tags (at least one RFID tag) provided to them, (on a small card for example), while others, such as the second user using the second mobile device 117, employ a USB based uWallet.

In a related embodiment, all mobile users of the system 105, such as the first user using the first mobile device 107 and the second user using the second mobile device 117, employ RFID based secure uWallets, wherein each such secure uWallets comprise at least one unique RFID tag (that uniquely identifies the user in the system 105). The secure server 111 maintains a mapping of user client certificates and PINcodes to RFID tags assigned to the users.

In one embodiment, the system 105 displays photos of the first user to the second user during financial transactions, to aid in user identification, and vice versa. For example, it displays, on the first mobile phone 107, a second photographic image associated with the second user, and at the second mobile phone 117 a first photographic image associated with the first user, during the initiation of the financial transactions between the two users.

In one embodiment, the system 105 is used for conducting financial transactions using mobile phones. The first personal electronic wallet 109 is capable of providing a first unique identification associated with a first user, when communicatively coupled to the first secure mobile device 107. The server 111 is a transaction server that is communicatively coupled to the first secure mobile device 107, and it comprises a user account, wherein the user account is associated with the first unique identification and the first user (using the first secure mobile device 107). The transaction server 111 facilitates debiting and crediting accounting transactions on the user account as the first user conducts mobile transactions using the first secure mobile device 107, with the first personal electronic wallet 109 plugged in (or otherwise) communicatively coupled to the first secure mobile device 107. The first secure mobile device 107 solicits a user personal identification code from the first user when the first personal electronic wallet 109 is communicatively coupled to the first secure mobile device 107. The first secure mobile device 107 securely interacts with the first personal electronic wallet 109 and conducts a funds transfer transaction when the first personal electronic wallet 109 is communicatively coupled to the first secure mobile device 107 and the user is authenticated at least by means of the personal identification code. The first secure mobile device 107 securely reports the funds transfer transaction to the transaction server 111 over a secure mutually authenticated network established between the transaction server 111 and the first secure mobile device 107. Thus, the first personal electronic wallet 109 enables secure financial transactions in the system. The first personal electronic wallet 109 comprises the first unique identification that uniquely identifies the first personal electronic wallet 109 and a driver software that communicates the first unique identification to the first secure mobile device 107 to which the first personal electronic wallet 109 is communicatively coupled. The first unique identification is associated with a first security credentials that is used by the first secure mobile device 107 to communicate with the transaction server 111. The first personal electronic wallet 109 also provides security credentials for mutual authentication and secure communications with the transaction server 111.

In general, the present invention makes it possible to securely authenticate a rural user (using the unique user ID retrieved from the uWallet 109, the client certificate available (downloaded from the server 111 or retrieved from the uWallet 109) in the mobile phone 107 of the rural user and a PIN code/password provided by the rural user when prompted. The unique identification retrieved from the user's uWallet 109 is mapped to the PIN code supplied by the user when prompted, and the client certificate available in the mobile phone 107 (keys associated with the client certificate). After secure authentication, the user is permitted to conduct monetary transactions, such as money transfers, bill payment, mobile banking transactions, etc. over the mobile phone 107.

In one embodiment, the mobile phones 107 and 117 are USB On-The-Go (OTG) devices, and they each have one USB connector: a Micro-AB receptacle. This receptacle is capable of accepting either a Micro-A plug or a Micro-B plug attached to any of the legal cables and adapters. The uWallet 109 and the uWallet 119 are attached to the respective mobile phones 107, 117 employing their Micro-A or Micro-B connectors. The mobile phones 107, 117, provide powering the USB interface when required and by default assumes the role of host (especially when a Micro-A type uWallet is plugged in). When a Micro-B type uWallet 109, 119 is plugged into these mobile phones, they by default assume the role of a peripheral device and allow the uWallet 109, 119 to provide power. In addition, the mobile phone 107, 117 can change their behavior and provide power on the USB port or stop powering the USB port based on user management/activation of the associated feature/behavior.

In one embodiment, the uWallet 109, 119 provide only the unique identification to identify their users/owners, and the mobile phones 107, 117 provide secure communications (based on SSL or TLS) employing secure communications certificates that may have been dispensed by the secure server 111. The user is prompted to provide a passcode when the uWallet 109, 119 is plugged into a corresponding mobile phone 107, 117 before the unique identification is retrieved by the mobile phone 107, 117. In a related embodiment, the secure server 111 verifies the mapping of the first and second PIN codes to the first and second unique identification (retrieved from the respective uWallets), respectively, to authenticate the corresponding users.

In another embodiment, the uWallet 109, 119 provides not only the unique identification to identify their users/owners, but also certificates for secure communications that are used by the corresponding mobile phones 107, 117 to interact securely with the secure server 111. The user is prompted to provide a passcode when the uWallet 109, 119 is plugged into a corresponding mobile phone 107, 117 before the unique identification and the certificates for secure communications is retrieved by corresponding mobile phone 107, 117.

Figure 2:
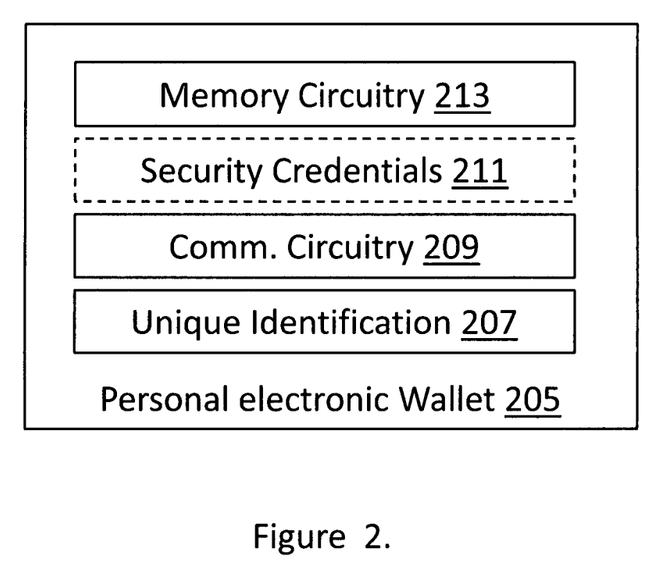
FIG. 2 is a perspective block diagram of a personal electronic wallet that provides a unique identification when communicatively coupled to a mobile phone, thereby providing an ability to uniquely detect the participant in funds transfer and payment transactions from the corresponding mobile phone.

FIG. 2 is a perspective block diagram of a personal electronic wallet 205 that provides a unique identification when communicatively coupled to a mobile phone 107, thereby providing an ability to uniquely identity the participant in funds transfer and payment transactions from the corresponding mobile phone 107. The personal electronic wallet 205 comprises a unique identification 207 that can be retrieved from a mobile phone, a communication circuitry 209 that provides secure communications with a mobile phone and a memory circuitry 213 that helps store transaction related parameters or transaction related data (such as receipts, transaction records, etc.). It also comprises an optional set of security credentials 211 that are used for secure communications with the mobile phone (that is currently associated with the personal electronic wallet 205) in one embodiment, and an optional set of client certificates and user account information in another related embodiment, wherein the client certificates are used for secure mutual authenticated communications with a secure server 111 and the user account is used to conduct debit and credit operations during user initiated funds transfer and payments activities.

The communication circuitry 209 is a USB based communication circuitry in one embodiment, wherein the personal electronic wallet 205 and the mobile phone interact securely, such as during communication of the unique identification to the mobile phone. In a related embodiment, it comprises a battery that makes it possible to also power the communications between the personal electronic wallet 205 and the mobile phone.

The communication circuitry 209 is a bluetooth based communication circuitry in one embodiment, wherein the mobile phone and the personal electronic wallet 205 are first paired before providing secure communications between the two.

Thus, the present invention provides an USB based secure memory stick/dongle (also sometimes called uWallet) that, in general, makes it possible to make payments, funds transfer etc. from the mobile phone of a user, that also sometimes behaves as a credit card/bank card while connected to a mobile phone. A user can conduct monetary transactions when the USB based secure memory stick/dongle is plugged into the mobile device and the mobile device has connectivity (2G, 3G, etc.). A unique user ID is provided in each USB based secure memory stick/dongle that uniquely identifies the user, the unique user ID is known to the server of the network (such as the secure server 111 with the SPN) and is part of the authentication process.

In general, the present invention makes it possible to securely authenticate a rural user (using the unique user ID from the uWallet, the client certificate in the mobile phone of the rural user and PIN code/password) and then permit mobile banking transactions over the mobile phone. Both participating individuals employ their individual mobile phones and secure USB/Bluetooth based mobile banking devices (the uWallet). This makes it possible for a rural user to make balance inquiry, receive funds remotely with no need for ATMs or bank teller counters and make payments to other farmers and merchants who have similar USB mobile banking devices (uWallets). It is also possible to integrate the said invention with external authentication systems.

In one embodiment, the personal electronic wallet is an RFID based electronic device that is capable of interacting with a mobile phone and present its unique identification code, which the mobile device uses during financial transactions, or communicates to a secure server 111 as required.

Figure 3:
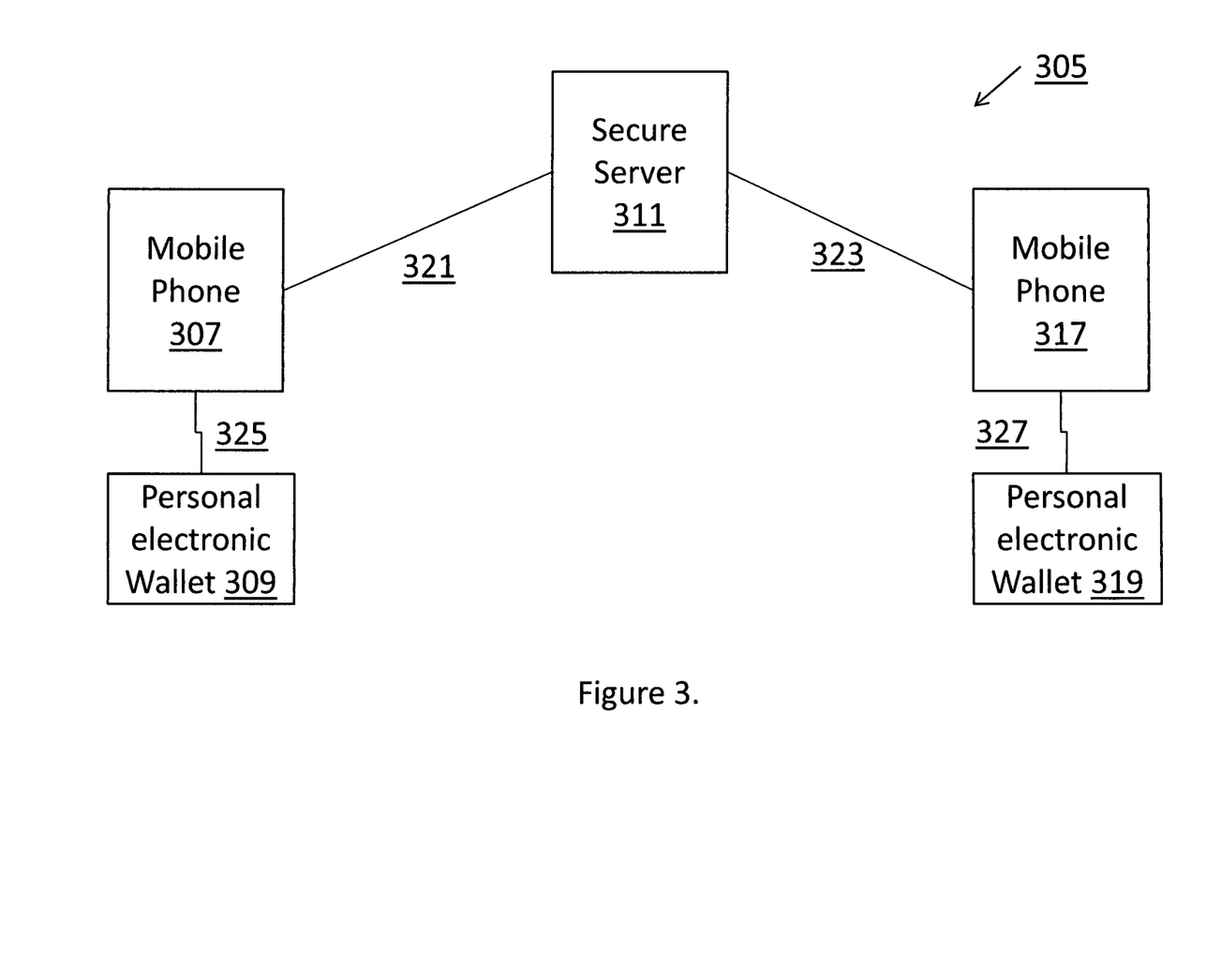
FIG. 3 is perspective block diagram of a system for conducting financial transactions using mobile phones, wherein secure funds transfer and financial transactions can be conducted by, and between rural people, using their mobile phones, without the use of PCs, modern POS-devices, ATM-machines or credit/debit cards, wherein the communication networks are not secure.

FIG. 3 is perspective block diagram of a system 305 for conducting financial transactions using mobile phones 307, 317, wherein secure funds transfer and financial transactions can be conducted by, and between rural people, using their mobile phones 307, 317, without the use of PCs, modern POS-devices, ATM-machines or credit/debit cards, wherein the communication networks are not secure. The participants on such secure funds transfer transactions employ their personal electronic wallets (also referred to as uWallets) 309, 319 to enable authentication of the participants. The secure server 311 makes it possible for users to authenticate themselves (employing one or more security means) and conduct funds transfer, payments, balance inquiry and other financial transactions.

The first mobile phone 307 communicates with the secure server 311 employing a non-secure communication link, 321, such as TCP/IP, HTTP, etc. Similarly, the second mobile phone 317 communicates with the secure server 311 employing a non-secure communication link, 323, such as TCP/IP, HTTP, etc. The first mobile phone 307 retrieves a public-private key-pair from the first personal electronic wallet 309 and encrypts data sent to the server 311 (or to other devices/servers) using the public key of the recipient (which can be the second mobile phone 317), while also sending its public key to the recipient. The second mobile device 317 receives the encrypted data from the first mobile device 307, along with the public key sent by the first mobile device 307. The second mobile device 317 retrieves the corresponding public-private key pair from the second personal electronic wallet 319. It then decrypts the received encrypted data using the private key retrieved from the second personal electronic wallet 319. It the generates a response message, encrypts the response message employing the public key received from the first mobile phone 307, and then communicates it to the first mobile device 307 (over a non-secure communication link 323). This encrypted response message is sent along with the public key retrieved from the second personal electronic wallet 319. The first mobile device receives the encrypted response, decrypts it using the private key (retrieved from the first personal electronic wallet 309) and processes the response message. Further interactions between first and second mobile phones 307, 317 are conducted as necessary over the non-secure communication links 321, 323 using similar encrypted messages. The public keys of the individual mobile phones 307, 317 are not sent repeatedly for efficiency, and are only in the first message (in a session or set of messages) or when requested.

Figure 4:
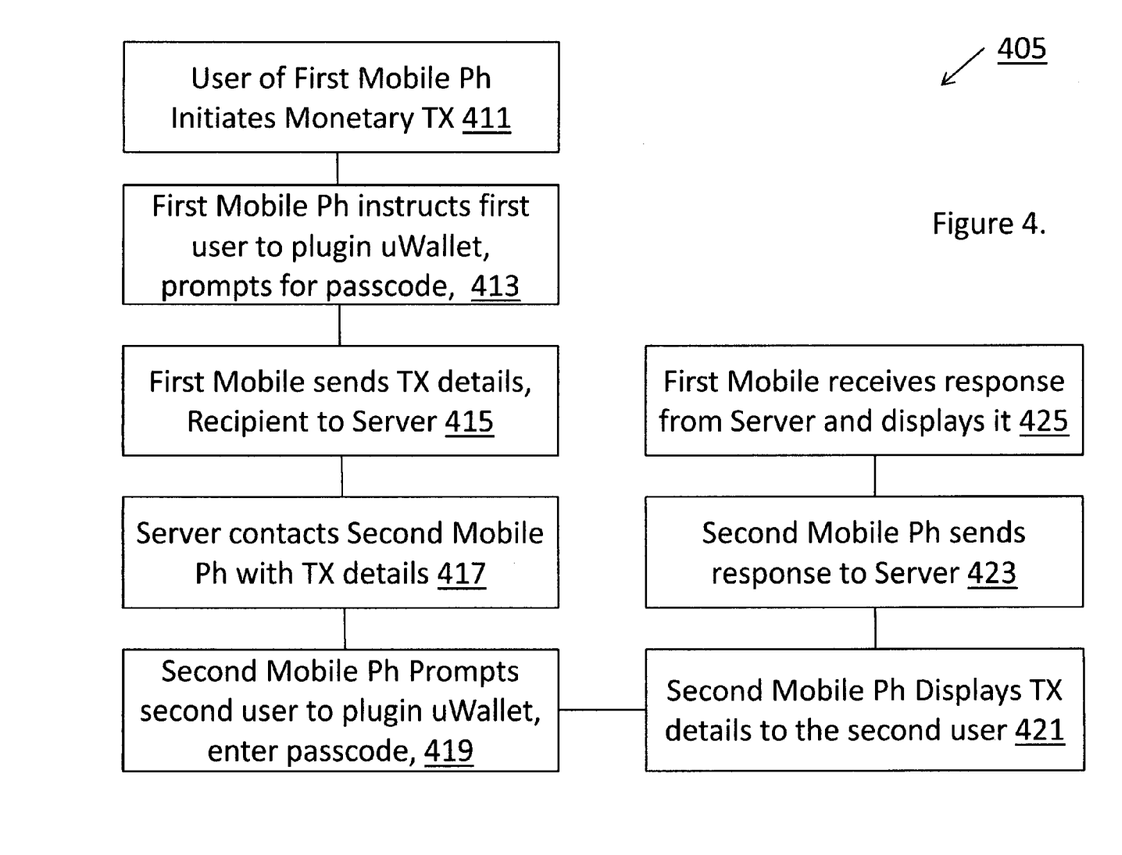
FIG. 4 is a work flow diagram of an exemplary operation of the system 105 for conducting mobile monetary transactions aided by uWallets used by the participants.

FIG. 4 is a work flow diagram of an exemplary operation of the system 105 for conducting mobile monetary transactions aided by uWallets used by the participants. The exemplary operation is initiated by a user of the first mobile phone 107. At a first block 411, the user of the first mobile device 107 selects one of the supported monetary transactions (such as mobile payments, money transfer, etc.) on the first mobile device 107. Then, at a next block 413, the first mobile phone 107 instructs the first user to plugin his uWallet 109 into the first mobile device 107, if it is not yet plugged in. It then prompts the user to authenticate himself/herself, by entering a passcode (sometimes called a PIN code). Such passcode can be a 4 digit number, such as 9999, or a combination of text and numerals. The user is also prompted for a recipient phone number (or reference to a recipient, such as a recipient account number, etc.), a transaction amount (such as 100 dollars, etc.), a transaction type and other relevant details.

At a next block 415, the first mobile phone 107 sends the recipient information and transaction details to the server 111, for communication to the second mobile phone 117. Then, at a next block 417, the server 111 contacts the second mobile phone and communicates the transaction details. At a next block 419, the second mobile phone 117 prompts the second user to plugin the uWallet, if it is not yet plugged in, and prompts the user to enter an associated passcode (associated with the second user). This passcode helps authenticate the second user.

At a next block 421, the second mobile phone displays the transaction details to the second user. Then, at a next block 423, the second mobile phone collects the user response provided by the second user and sends it to the server 111. Finally, at the next block 425, the first mobile phone receives the response from the server 111 and displays it to the user of the first device. Additional interactions between the first user and the second user may occur in a similar fashion, as part of the individual transactions.

In one embodiment, the communication between the first mobile phone 107 and the server 111 at the block 415 and the block 425 occurs over a secure communications link with mutual authentication at the transport layer. Similarly, the communication between the second mobile phone 117 and the server 111 at the block 417 and the block 423 occurs over a secure communications link with mutual authentication at the transport layer.

In one embodiment, the server 111 is incapable of deciphering the data being communicated between the first mobile device 107 and the second mobile device 117. For example, transaction data sent from the first mobile device 107 when encrypted by the public key of the second mobile device 117 is not decipherable by the server 111 but only by the second mobile device, although the server 111 may be involved in transferring such transaction data between the two mobile phones 107, 117.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

As one of ordinary skill in the art will appreciate, the terms "mobile phone" and "mobile device," as may be used herein, include cellular phones, personal digital assistants (PDAs), handheld devices, MP3 players with communication links, touchpad based small devices, digital ebook readers, game controllers (such as XBOX controllers) etc.

As one of ordinary skill in the art will appreciate, the terms "USB" as may be used herein, include USBLO, USB 2.0, USB 3.0 and other variations to the USB protocol. The term "USB based memory sticks" in general includes FLASH based memory sticks that employ regular USB, mini-USB, or micro-USB connectors to connect to mobile devices, etc. The USB based memory sticks may employ Mini-A and Mini-B plugs that are approximately 3 by 7 mm, or the Micro plugs that have a similar width but approximately half the thickness, enabling their integration into thinner portable devices. The USB based memory sticks may also employ Micro-AB receptacle. This receptacle is capable of accepting either a Micro-A plug or a Micro-B plug attached to any of the legal cables and adapters.

Although the present invention has been described in terms mobile phones and servers, it must be clear that the present invention also applies to other types of devices including mobile devices, laptops with a browser, a hand held device such as a PDA, a television, a set-top-box, a media center at home, robots, robotic devices, vehicles capable of navigation, and a computer communicatively coupled to the network.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A system for conducting financial transactions using mobile phones, the system comprising:
    a secure server that facilitates financial transactions between a first personal electronic wallet device of a first user and a second personal electronic wallet device of a second user, wherein the secure server comprises a user account, that is associated with a first user identification information and the first user;
    the first personal electronic wallet device that is arranged to communicatively couple securely with a first secure mobile device when disposed externally on the first secure mobile device;
    the first personal electronic wallet device stores and provides only the user identification information and security information to the first secure mobile device for interactions with the secure server,
    the first secure mobile device securely interacting with the secure server and conducting financial transactions, when the first personal electronic wallet device is externally disposed on, and communicatively coupled to the first secure mobile device and the first user is authenticated and identified at the secure server;
    the first secure mobile device prompting the first user to pick one of the financial transactions;
    the secure server receiving details about the one of the financial transactions and a target identification associated with the second user or associated with the second mobile device;
    the second mobile device prompting the second user to communicatively couple a second electronic wallet to the second mobile device and to enter a PIN code for authentication;
    the secure server transferring details regarding the one of the financial transactions to the second mobile device for display to the second user; and
    the secure server sending a user response received from the second mobile device regarding the one of the financial transactions.

2. The system of claim 1 further comprising:
    a second secure mobile device that interacts with the secure server over the secure mutually authenticated network;
    the second personal electronic wallet device arranged to communicatively couple securely with the second secure mobile device;
    the secure server facilitating a funds related transaction between the first secure mobile device and the second secure mobile device when the first personal electronic wallet device is communicatively coupled to the first secure mobile device and the second personal electronic wallet device is communicatively coupled to the second secure mobile device.

3. The system of claim 2, wherein the first personal electronic wallet device and the second personal electronic wallet device are universal serial bus (USB) based memory sticks that are arranged to be physically and communicatively coupled to the first secure mobile device and the second secure mobile device, respectively.

4. The system of claim 2, wherein the first personal electronic wallet device and the second personal electronic wallet are Bluetooth based memory sticks with a unique identification, that can be communicatively coupled to the first secure mobile device and the second secure mobile device, respectively.

5. The system of claim 2 further comprising:
    a second PIN code associated with a second user, wherein the second user is associated with the second secure mobile device;
    the first secure mobile device prompting the first user to provide a first PIN code when the user inserts the first personal electronic wallet into the first secure mobile device, the first secure mobile device then retrieving the first unique identification from the first personal electronic wallet device and then selectively facilitating financial transactions between the first secure mobile device and the second secure mobile device; and
    the second secure mobile device prompting a second user to communicatively couple the second personal electronic wallet device with the second secure mobile device and to provide the second PIN code for authentication, when the first user initiates financial transactions on the first secure mobile device.

6. The system of claim 5 further comprising:
    the secure server verifying mappings of the first PIN code and the second PIN codes to the first unique identification and a second unique identification, respectively, to authenticate the corresponding users.

7. The system of claim 6 further comprising:
    wherein the first personal electronic wallet device comprises a first unique identification that is communicated to the first secure mobile device after the first user is authenticated with the first PIN code;
    wherein the second personal electronic wallet device comprises a second unique identification that is communicated to the second secure mobile device after the second user is authenticated with the second PIN code; and
    the secure server verifying the first unique identification code and the second unique identification code to authorize the corresponding users for financial transactions.

8. The system of claim 7 further comprising:
    wherein the first secure mobile device comprises a first client security certificate used for authentication by the secure server;
    wherein the second secure mobile device comprises a second client security certificate used for authentication by the secure server;
    the secure server communicating a second public key associated with the second client security certificate to the first secure mobile device and a first public key associated with the first client security certificate to the second secure mobile device;
    the first secure mobile device employing the second public key to encrypt the data communicated to the second secure mobile device; and
    the second secure mobile device employing the first public key to encrypt the data communicated to the first secure mobile device.

9. A method of operating a system supporting secure financial transaction communications for mobile devices, the system comprising a secure server comprising processor, memory and storage, the method comprising:

prompting the first user on the first mobile device to pick one of a set of supported financial transactions;

receiving, at the secure server from a first mobile device, a first personal identification (PIN) code, and a first unique identification, when the first electronic wallet device is disposed externally on the first secure mobile device;

identifying a first user of the first mobile device, at the secure server, using the first PIN code and the first unique identification;

receiving, from the first user details about the one of a set of supported financial transactions and a target identification associated with a second user or associated with the second mobile device;

prompting the second user to communicatively couple the second electronic wallet to the second mobile device and to enter a second PIN code for authentication;

receiving, at the secure server from the second mobile device, the second PIN code, and a second unique identification;

transferring details regarding the one of a set of supported financial transactions to the second mobile device for display to the second user;

identifying the second user of the second mobile device, at the secure server, using the second PIN code and the second unique identification; and facilitating, by the secure server, the one of a set of supported financial transactions between the first user and the second user;

sending, to the first mobile device, a user response received from the second mobile device, the user response regarding the one of a set of supported financial transactions.

10. The method of claim 9, wherein establishing mutual authentication occurs in a secure communications setup operation using one of a TLS based or SSL based protocol.

11. The method of claim 9, wherein the first electronic wallet device and the second electronic wallet device are each one of a universal serial bus (USB) based memory stick with unique identification support or a Bluetooth based memory stick with unique identification support.

12. The system of claim 1, wherein the secure server maintains an association of the first PIN, the first unique identification, and at least one financial account of the first user.

13. The method of claim 9, wherein the method further comprises:

establishing end-to-end secure communication between the first mobile device and the second mobile device by transferring a first public key associated with the first user from the first mobile device to the second mobile device and transferring a second public key associated with the second user from the second mobile device to the first mobile device, to enable:

encryption of all data sent from the first mobile device to the second mobile device using the second public key and encryption of all data sent from the second mobile device to the first mobile device using the first public key; and decryption of all data received from the first mobile device by the second mobile device using a second private key associated with the second user and decryption of all data received from the second mobile device on the first mobile device using the first private key associated with the first user.

14. The method of claim 13, wherein the method further comprises:

causing display, at the first mobile device, of a second photographic image associated with the second user, and causing display, at the second mobile device, a first photographic image associated with the first user.

15. The system of claim 12, wherein the at least one financial account of the first user comprises at least one bank account, and wherein the one of the financial transactions comprises a transfer of funds between bank accounts.

16. A system for conducting financial transactions using mobile phones, the system comprising at least one server each comprising processor, memory and storage, the system further comprising:

a first personal electronic wallet device comprising a first unique identification associated with a first user, the first personal electronic wallet device arranged to communicatively couple to a first secure mobile device when disposed externally on the first secure mobile device;

the at least one server arranged to communicatively couple to the first secure mobile device, the at least one server comprising at least one user account, wherein the at least one user account is associated with a first personal identification (PIN) code, the first unique identification and the first user;

the at least one server prompting the first user on the first mobile device to select one of a set of supported financial transactions;

the at least one server facilitating debiting and crediting accounting transactions on the at least one user account, as necessary, in accordance with the one of a set of supported financial transactions;

the at least one server receiving, from the first user on the first secure mobile device, details about a selected one of the set of supported financial transactions and a target identification, and determining a second mobile device as the target device for the selected one of the set of supported financial transactions;

the at least one server prompting a second user on the second mobile device to communicatively couple the second electronic wallet to the second mobile device and to enter a second PIN code for authentication;

the at least one server transferring details regarding the selected one of the set of supported financial transactions to the second mobile device for display to the second user; and the at least one server sending, to the first mobile device, a user response received from the second mobile device.

17. The method of claim 9, the method further comprising maintaining, at the secure server, an association of the first PIN, the first unique identification, and at least one financial account of the first user.

18. The system of claim 16 further comprising:

the first secure mobile device securely interacting with the first personal electronic wallet device and conducting a funds transfer transaction when the first personal electronic wallet device is communicatively coupled to the first secure mobile device and the first user is authenticated and identified, by the at least one server using the first PIN code and the first unique identification; and the first secure mobile device securely reporting the funds transfer transaction to the at least one server over a secure mutually authenticated network established between the at least one server and the first secure mobile device.

19. The system of claim 16, wherein the first personal electronic wallet device comprising;
- driver software used to communicate the first unique identification to the first secure mobile device to which the first personal electronic wallet device is communicatively coupled; and
- wherein the first unique identification is associated with a first security credential used by the first secure mobile device to communicate with the at least one server.

20. The system of claim 16, wherein the first personal electronic wallet device also provides security credentials for mutual authentication and secure communications with the at least one server.

21. The system of claim 16, wherein the at least one server maintains an association of the first PIN, the first unique identification, and at least one financial account of the first user.

22. The system of claim 21, wherein the at least one financial account of the first user comprises at least one bank account, and wherein accounting related financial transactions comprise a transfer between bank accounts.

23. The method of claim 17, wherein the at least one financial account of the first user comprises at least one bank account, and wherein the one of a set of supported financial transactions comprises a transfer of funds between bank accounts.

* * * * *